Sept. 22, 1964  F. R. KOZNARSKI  3,149,419
METHOD OF AND APPARATUS FOR TROLLING
Filed April 1, 1963  2 Sheets-Sheet 2
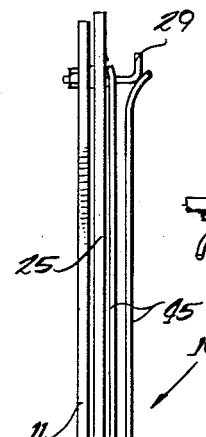
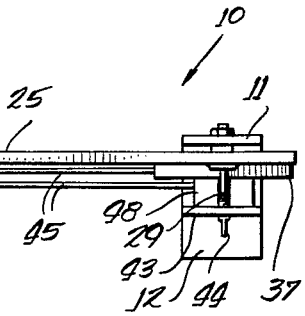
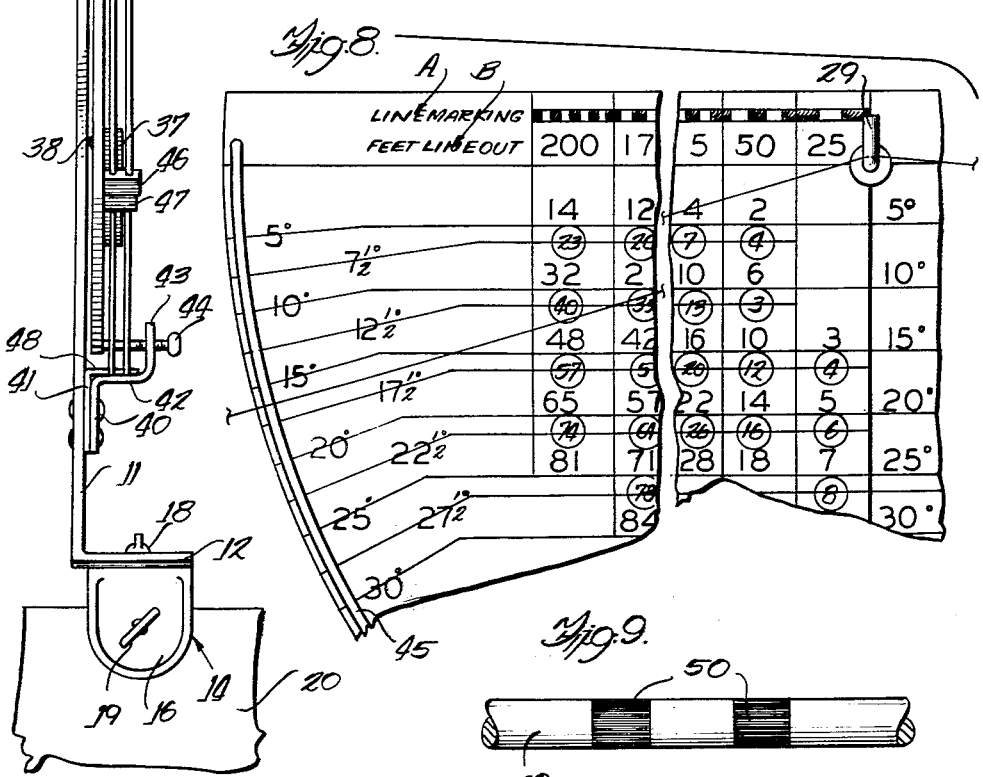

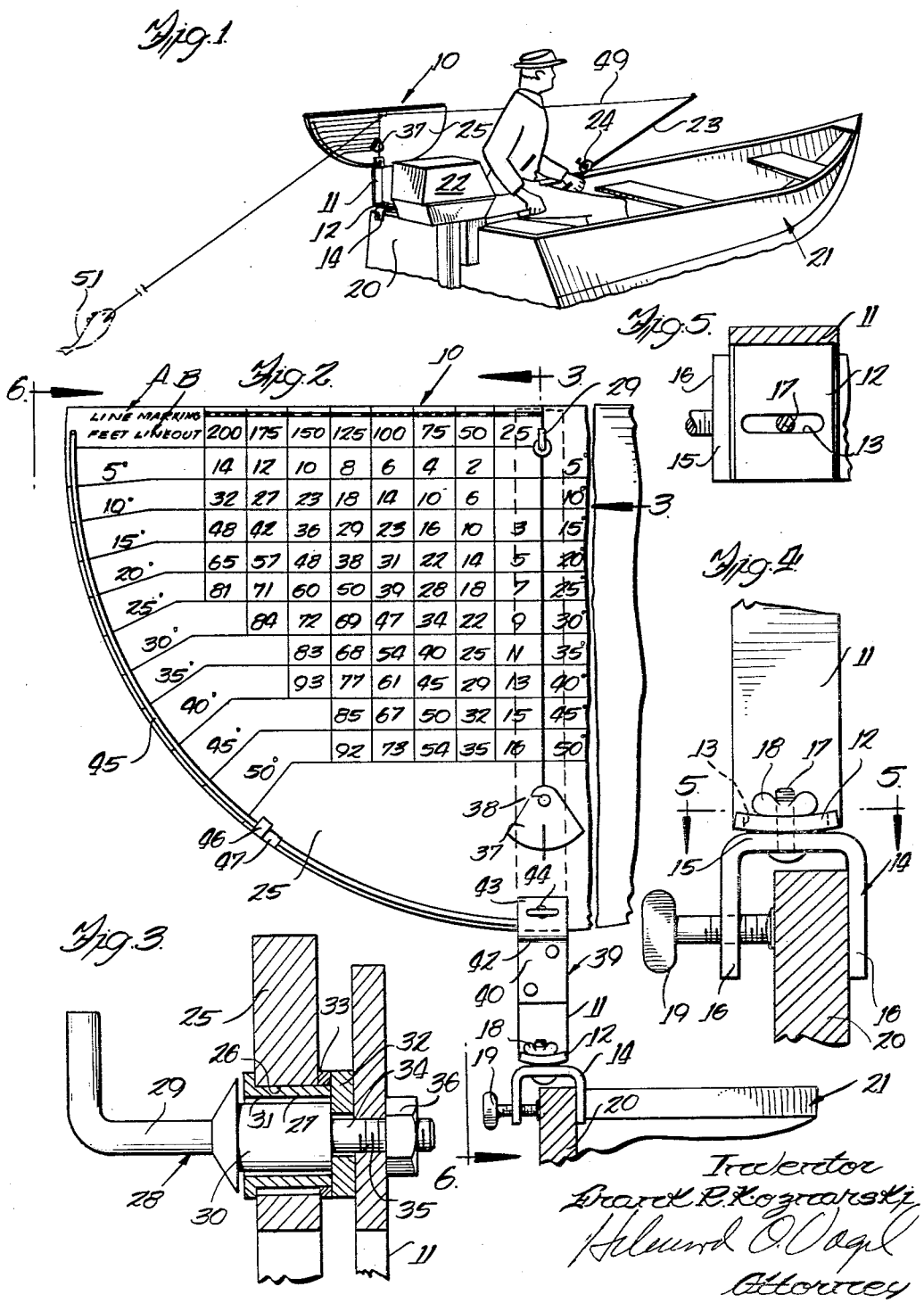

3,149,419
METHOD OF AND APPARATUS FOR TROLLING
Frank R. Koznarski, Chicago, Ill.
(1501 Kemman Ave., La Grange Park, Ill.)
Filed Apr. 1, 1963, Ser. No. 269,310
6 Claims. (Cl. 33—126)

This invention relates to an improved method and apparatus for assisting a fisherman when fishing by the trolling technique. More specifically the invention relates to an improved method and apparatus by which the fisherman is easily enabled to determine the proper trolling depth for a lure.

During fishing by the technique of trolling it is particularly important to determine the proper depth at which the lure is being trolled. During certain natural conditions having to do with temperature, water conditions, etc., certain species of fish may be located and may feed at certain depths. Therefore, it is important to determine the running depth for each particular lure so that during trolling a lure may be maintained at the depth where fish are being caught. The depth therefore is very important as evidenced by many fishing experts who prescribe various depths for various fish at certain times at certain periods of the year and also by the prevalent use of the water depth thermometer which prescribes the water temperature and thus the water depth at which certain species of fish may be caught under certain conditions.

It is a prime object of this invention to provide an improved apparatus which can very inexpensively and quickly determine the depth running characteristics of a particular artificial lure.

Another important object is the provision of an improved apparatus for quickly assisting the fisherman in computing the depth at which his lure is catching fish so that he can again repeat the precise depth condition at a succeeding time and thus again troll at the particular depth which has been successful.

A still further object of the invention is to provide an improved trolling device which is used in connection with a fishing line which when the artificial bait is being towed will indicate on a suitable graph the approximate depth of the particular lure and which by means of a graph on the trolling device will indicate the depth and relation to the number of feet of line which are out so that the fisherman can maintain the same depth by simply increasing or decreasing the speed of forward motion of his boat.

A still further object is to provide an improved trolling device which will indicate the trolling depth of a fishing lure in conjunction with the line which is connected to the trolling device and which will also indicate to other fishermen in the boat the precise depth at which the fisherman will successfully catch fish.

A still further object is to provide an improved method and apparatus for trolling wherein the same type of lure has initially been successful in catching fish at a prescribed depth and prescribed trolling speed, can at a succeeding time be again accurately placed in the same depth position and trolling speed to again secure a similar result.

A still further object is to provide an improved device for accurately indicating the running depth of a particular lure so that the same lure may again be accurately positioned at the particular depth.

These and further objects will become more readily apparent from a reading of the description when examined in connection with the accompanying sheet of drawings.

In the drawings:

FIGURE 1 is a perspective view of a boat and fisherman showing an improved apparatus for trolling mounted on the boat and in operation during a trolling run;

FIGURE 2 is a front elevational view of an apparatus for trolling or for computing a trolling depth mounted on the transom of a boat;

FIGURE 3 is a cross sectional view taken substantially along the line 3—3 of FIGURE 2;

FIGURE 4 is a fragmentary enlarged detail view showing a bracket connection of a trolling device connected to the transom board of a boat;

FIGURE 5 is a cross sectional detail view taken along the line 5—5 of FIGURE 4;

FIGURE 6 is a rear view of a trolling device looking toward the rear of a boat on which the said device is mounted;

FIGURE 7 is a plan view of a portion of a trolling apparatus or device;

FIGURE 8 is an enlarged view of a graph board showing the markings thereon with a modification in the markings over those shown in FIGURE 2; and FIGURE 9 is a detail view of a marked fishing line.

Referring now particularly to FIGURES 1 and 2 an apparatus or device for assisting in trolling is generally designated by the reference character 10. The device 10 comprises a vertical support 11 having at its lower end a horizontal leg 12 arcuately shaped in cross section. As best shown in FIGURE 5 the leg 12 is provided with slot 13. A U-shaped clamp as shown in FIGURE 4 is provided with a base 15 having downwardly extending legs 16. A screw 17 extends through the base 15 and through the slot 13 and a wing nut 18 suitably connects the vertical support 11 to the U-shaped clamp 14. A wing screw 19 is threaded through one of the legs 16, and as best shown in FIGURE 4, rigidly connects the clamp 14 to a transom board 20 of a boat generally designated at 21 in FIGURE 1.

The boat 21 has a fisherman positioned therein and uses for propulsion an outboard motor generally designated at 22. The fisherman has in one hand a fishing rod 23 suitably provided with a reel 24. The device 10 may of course also be utilized when the rod 23 may simply be supported within the boat and it is unnecessary for the fisherman to grasp the rod until fish strike which is in many instances conventional in trolling.

As best shown in FIGURES 1, 2 and 8 the graph board, in the shape of half a circle, is designated by the reference character 25. The graph board 25 may be of plastic or of any suitable construction. The graph board 25, as shown in FIGURE 3, is provided at its upper end with an opening 26 having positioned therein a bushing 27. A line guide is generally designated at 28 and includes an L-shaped arm 29 having an enlarged cylindrical bearing portion 30 which is disposed within a bore 31 of the bushing 27. Washers 32 and 33 suitably space the graph 25 from the support 11 and a reduced threaded portion 34 is connected to and extends from the bearing member 30 through an opening 35 and is suitably connected to a threaded fastener 36. The connection permits the graph board 35 to swing freely about the pivot bearing 30 while the L-shaped arm 29 is maintained in a stationary position. As best shown in FIGURE 2 a weight 37 is loosely and swingably connected to the board 25 by means of a screw 38 directly vertically below the pivot point provided by the line guide 28. The bracket 39 is positioned immediately above the leg 12, the said bracket comprising a vertical leg 40 which is seated upon a portion of an L-shaped bracket 41. The last mentioned portion of the L-shaped bracket 41 and leg 40 are suitably connected to the vertical support 11. The leg 40 is connected to a horizontal leg 42 which in turn is connected to a vertically extending flange 43. A wing screw 44 is threaded through the flange 43 and engages the graph board 25 for pressing the same against the vertical support 11 to restrain the board against pivotal movement when the device is in a non-use position.

Arcuate guide rods 45 extend along the arcuate edge of the guide board 25 as indicated. The guide rods 45 have a space therebetween as best shown in FIGURE 6 and are connected at their lower ends to the leg 42. The L-shaped bracket 41 has a horizontally extending portion 48 which extends over the ends of the rods 45 and is suitably connected thereto to securely connect the same to the bracket 41. A rubber grommet 46 is supported on the rods 45 as best shown in FIGURE 2 and a connector element 47 further supports the rods 45 in spaced relation.

As best shown in FIGURES 1 and 9 a fishing line is designated at 49 and the said line is provided at suitable intervals of 25 feet with markings, one of the markings which is designated at 50. The end of the fishing line is connected to a suitable artificial lure as designated at 51. Referring now particularly to the graphs shown in FIGURES 2 and 8 the top line A designates fishing line markings. As indicated in FIGURE 9 one of these markings 50 is shown. The fishing line may be black in color, and at 25 feet there may be one white mark 50, at 50 feet there would be two white marks, at 75 feet three, and at 100 feet four white marks. Starting with 125 feet the same coding may be utilized but the markings may be in red or other different colors. Thus the fishing line 49 is so marked at every 25 feet so that the fisherman very quickly knows how much line he has out in number of feet. Thus it is also this line marking indication which is provided by the line A on the graph 25 which provides a visual chart to which the fisherman can refer.

A "feet line out" is designated in row B of graph 25 and the said feet are indicated as 25, 50 and increments of 25 up to 200. The lowest number of feet is of course closest to the pivot point of the graph and the line guide 29. Rows C are the rows following or disposed underneath line B and each of these rows is designated at C. In this case the rows indicate depth of lure with each row successively having increased depths in the manner indicated. The markings 5°, 10°, etc., located adjacent the guide rods 45 and to the right of the guide element 29 in FIGURE 2 merely indicate the diagonal position of the fishing line during the trolling operation. The designations on the graph board 25 shown in FIGURE 8 are substantially similar with the exception that in this case one-half markings are shown between the rows C and also the degrees are shown in one-half markings. Otherwise the graph is identical.

In the operation of the trolling device and computer one or a number of persons may be in the boat and the device 10 is secured to the transom 20 of the boat as indicated in FIGURES 1, 2 and 6. The upright or particular position with respect to the water level is determined and the wing nut 18 is tightened. The wing screw 44 is now loosened so that the graph 25 may freely swing about its pivot and thereby assume a plumb position regardless of the pitch and toss of the boat 21. The point or pivot or the line guide 29 is approximately three feet from the water's edge and the fisherman now lets out a desired number of feet while the boat is being propelled by the motor 22. Supposing now he lets out the 125 feet of line as measured by the markings 50 he trolls with a particular lure until a strike indicates that he is at a depth wherein the fish are biting at the particular time. He checks the diagonal position of the line which may be anywhere between the 5° and 50° and he sees in this case for instance that the line intersects or crosses the figure 38 which is disposed immediately below in vertical alignment with the figure 125 which is the number of feet out. He now knows that this particular lure at 125 feet out has a running depth of 38. He now wishes to maintain this depth and trolling speed since it is at this level and lure or trolling speed that he has had success. Supposing the wind increases and the wind resistance causes the boat to slow down in speed, he thereupon simply increases the speed of the motor until the fishing line again intersects the figure 38 and maintains the speed so that the line continues to intersect 38 whereupon he knows that he is at the proper depth desired. If the wind diminishes, the reverse of course will take place. Other fishermen in the boat also can set their lines three feet above the water, let out 125 feet as indicated by their marked lines and thus fish at the same depth that successful trolling is being accomplished.

Supposing now the fisherman reverses his course of direction and he wishes to continue fishing at the same depth and trolling speed. He again changes the speed of his motor until the fishing line, extending from the line guide 29 across the graph and through the space provided by the rods 45, falls upon the figure 38 wherein he now knows that he is again at the proper fishing depth. He can determine the depth running characteristics of other lures that he uses in the trolling technique so that in each case he will know that by letting out a line a given number, at a certain speed he would achieve a certain running depth with that particular line, from previous experience with the apparatus described.

Also it is of course readily understood by fishermen that lures vary greatly in their depth running characteristics depending upon their shape or weight. Thus with this device the fisherman can accurately graph these characteristics for each particular lure and thus in each given case he knows how each lure will perform insofar as depth running characteristics are involved. He can also make adjustments by letting out longer line or shorter line thereby changing, of course, the depth position of the lure which is readily determined from the graph board 25 or he may add additional weight on his line to change the running characteristics as desired. Thus the device also is particularly adaptable to determining the running characteristics of the different lures whereby the fisherman may chart the same so that under any given conditions he can achieve the same running depth that he has been successful with in the use of particular previous lure. It is also for instance apparent that having determined the depth of run for a particular lure at a given speed at for instance 100 feet out, the diagonally extending fish line from the guide element 29, extends diagonally at 25° and intersects the marking 23 which would indicate a running depth of 23 feet for the particular lure. From this graph now he would conclude that at 175 feet of line out the running depth of this lure would be 57 feet. Thus it is also clear that the graph may be used for quickly indicating to the fisherman the running characteristics of the same lure at different lengths of line out.

Thus it is clear that an improved apparatus and method for trolling and computing the trolling characteristics of a lure have been set forth and that the objects of the invention have been fully achieved. It must be understood that changes and modifications may be made without departing from the spirit of the invention as disclosed or from the scope thereof as defined in the appended claims.

What is claimed is:
1. A fish trolling indicating device comprising;
   (a) an upright support,
   (b) means on said support for mounting the same in a variety of upright and angled positions on the structure of a boat,
   (c) an upright graph board including pivot means connecting said board to said support whereby in one position said board is balanced for free pivotal movement,
   (d) a weight on said board normally maintaining said board plumb by force of gravity during free pivoting movement,
   (e) a pair of transversely spaced arcuate guide elements connected at one end to said upright support,
   (f) a line guide connected to said upright support and extending outwardly from said support substantially coaxially with said pivot means,

(g) a horizontal row of numerals indicating line in feet and disposed at the top of said board, the lower number being disposed closest to said line guide element and progressively increasing to the numeral disposed farthest from said line guide element, (h) a plurality of horizontal rows of numerals denoting depth, the numerals denoting depth of each row being vertically aligned with each other and the numerals denoting line in feet out.

(i) the numerals of each row denoting in depth of feet progressively increasing from the smallest numeral in vertical alignment with said lowest numeral denoting line of feet out, (j) a fishing line adapted to be connected to a reel, (k) said fishing line having markings thereon at spaced intervals indicating number of feet out, (l) and a fishing lure connected to the end of said line, (m) said line extending from the lure in the water engaging said guide elements and said line guide and extending to a reel whereby said line intersects certain of the numerals denoting depth and whereby the operator having determined the feet of line out by the markings on said line, reads down vertically from the particular line in feet out markings of said board to the intersection of said line with the numeral indicating depth and determines a depth reading for said lure.

2. A fish trolling indicating device in accordance with claim 1, including means between said upright support and said graph board for locking said board against pivoting movement.

3. A fish trolling indicating device comprising;

(a) an upright support, (b) means on said support for mounting the same in an upright position on the structure of a boat, (c) an upright graph board including pivot means connecting said board to said support whereby in one position said board is balanced for free pivotal movement, (d) a weight on said board normally maintaining said board plumb by force of gravity during free pivoting movement, (e) a pair of transversely spaced arcuate guide elements supported by said support and positioned adjacent an end of said board disposed rearwardly of said support, (f) a line guide element connected to said upright support and extending outwardly from said support substantially coaxially with said pivot means, (g) a horizontal row of numerals indicating line in feet and disposed at the top of said board, the lower number being disposed closest to said line guide element and progressively increasing to the numeral disposed farthest from said line guide element, (h) a plurality of horizontal rows of numerals denoting depth, the numerals denoting depth of each row being vertically aligned with each other and the numerals denoting line in feet out, (i) the numerals of each row denoting in depth of feet progressively increasing from the smallest numeral in vertical alignment with said lowest numeral denoting line of feet out, (j) a fishing line adapted to be connected to a reel, (k) said fishing line having markings thereon at spaced intervals indicating number of feet out, (l) and a fishing lure connected to the end of said line, (m) said line extending from the lure in the water and engaging said guide elements and said line guide element and extending to a reel whereby said line intersects certain of the numerals denoting depth and whereby the operator having determined the feet of line out by the markings on said line, reads down vertically from the particular line in feet out markings of said board to the intersection of said line with the numeral indicating depth and determines a depth reading for said lure.

4. A fish trolling indicating device comprising;

(a) an upright support, (b) means on said support for mounting the same in an upright position on the structure of a boat, (c) an upright graph board including pivot means connecting said board to said support whereby in one position said board is balanced for free pivotal movement, (d) means on said board normally maintaining said board plumb by force of gravity during free pivoting movement, (e) guide means supported by said support adjacent one end of said board disposed rearwardly of said support, (f) a line guide element connected to said upright support and extending outwardly from said support substantially coaxially with said pivot means, (g) a horizontal row of numerals indicating line in feet out disposed at the top of said board, the lower numbers being disposed closest to said line guide element and progressively increasing to the numeral disposed farthest from said line guide elements, (h) a plurality of horizontal rows of numerals denoting depth, the numerals denoting depth of each row being vertically aligned with each other and the numerals denoting line in feet out, (i) the numerals of each row denoting depth of feet progressively increasing from the smallest numeral in vertical alignment with said lowest numeral denoting line of feet out, (j) a fishing line adapted to be connected to a reel, (k) said fiishing line having markings thereon at spaced intervals indicating number of feet out, (l) and a fishing lure connected to the end of said line, (m) said line extending from the lure in the water engaging said guide means and said line guide element and extending to a reel whereby said line intersects certain of the numerals denoting depth and whereby the operator having determined the feet of line out by the markings on said line, reads down vertically from the particular line in feet out markings of said board to the intersection of said line with the numeral indicating depth and determines a depth reading for said lure.

5. A fish trolling indicating device comprising;

(a) an upright support, (b) means on said support for mounting the same in an upright position on the structure of a boat, (c) an upright graph board including pivot means connecting said board to said support whereby in one position said board is balanced for free pivotal movement, (d) said board normally being maintained plumb by force of gravity during free pivoting movement, (e) a pair of transversely spaced arcuate guide means supported adjacent said board, (f) a line guide element connected to said upright support and extending outwardly from said support, (g) a horizontal row of numerals indicating line in feet and disposed at the top of said board, the lower number being disposed closest to said line guide element and progressively increasing to the numeral disposed farthest from said line guide element, (h) a plurality of horizontal rows of numerals denoting depth, the numerals denoting depth of each row being vertically aligned with each other and the numerals denoting line in feet out, (i) the numerals of each row denoting in depth of feet progressively increasing from the smallest numeral in vertical alignment with said lowest numeral denoting feet of line out, (j) a fishing line adapted to be connected to a reel, (k) said fishing line having markings thereon at spaced intervals indicating number of feet out, (l) and a fishing lure connected to the end of said line, (m) said line extending from the lure in the water between said transversely spaced guide means and guide element to a reel whereby said line intersects certain of the numerals denoting depth and whereby the operator having determined the feet of line out by the markings on said line, reads down vertically from the particular line in feet out markings of said board to the intersection of said line with the numeral indicating depth and determines a depth reading for said lure.

6. A fish trolling indicating device comprising;

(a) an upright support, (b) means mounting said support on the structure of a boat, (c) a graph board pivotally mounted on said support and adapted during a free pivoting position to assume a plumb position, (d) first guide means positioned near one end of said board, (e) second guide means on said board horizontally spaced from said first guide means, (f) a graph on said board, (g) said graph having markings indicating feet of line out between said first and second guide means, (h) said graph also having markings indicating depth of lure coordinated with said feet of line markings, (i) a line adapted to be attached to a reel, (j) a lure on the end of said line, (k) said line having markings thereon indicating the number of feet out, (l) whereby said line extends from said reel, is guided by said guide means, and said lure is in the water, said line intersects a depth of lure marking on said graph which coordinated with said line of feet out marking indicates a depth marking for said lure.

References Cited in the file of this patent

UNITED STATES PATENTS

| | | |
|---|---|---|
| 645,653 | White | Mar. 20, 1900 |
| 713,608 | Condlon | Nov. 18, 1902 |
| 1,846,912 | Sedgley | Feb. 23, 1932 |
| 2,950,536 | Hellwig | Aug. 30, 1960 |

FOREIGN PATENTS

| | | |
|---|---|---|
| 172,833 | Great Britain | Dec. 22, 1921 |